United States Patent [19]

Bryant et al.

[11] Patent Number: 4,575,341
[45] Date of Patent: Mar. 11, 1986

[54] TRAINING APPARATUS FOR ULTRALIGHT AIRCRAFT

[76] Inventors: Billy O. Bryant, 2600 Buena Vista, Bakersfield, Calif. 93304; William J. Mitchell, Jr., 3303 Morningside Dr., Hermosa Beach, Calif. 90254

[21] Appl. No.: 527,027

[22] Filed: Aug. 29, 1983

[51] Int. Cl.[4] .............................................. G09B 9/08
[52] U.S. Cl. ........................................ 434/35; 434/56
[58] Field of Search .................... 434/35, 37, 55, 56, 434/57, 29, 30, 33; 272/1 C, 31 A, 31 B

[56] References Cited

U.S. PATENT DOCUMENTS

| | | | |
|---|---|---|---|
| 1,007,467 | 10/1911 | Mangels | 434/37 X |
| 1,910,655 | 5/1933 | Traver | 434/37 |
| 1,924,390 | 8/1933 | Ball et al. | 434/56 |
| 1,947,962 | 2/1934 | Alfaro | 434/56 |
| 2,062,678 | 12/1936 | Rockwell | 434/56 |
| 2,323,322 | 7/1943 | Geisse | 434/56 |
| 2,357,481 | 9/1944 | Mallon | 434/55 |
| 2,896,947 | 7/1959 | Jacobs | 434/56 |

*Primary Examiner*—William H. Grieb

[57] ABSTRACT

Apparatus and method for training pilots in the operation of aircraft. The apparatus includes a means for generating a generally horizontal air stream mounted on movable support means. The air stream means and support means are tethered to an aircraft and their movement is responsive to movement of the aircraft during flight training.

6 Claims, 4 Drawing Figures

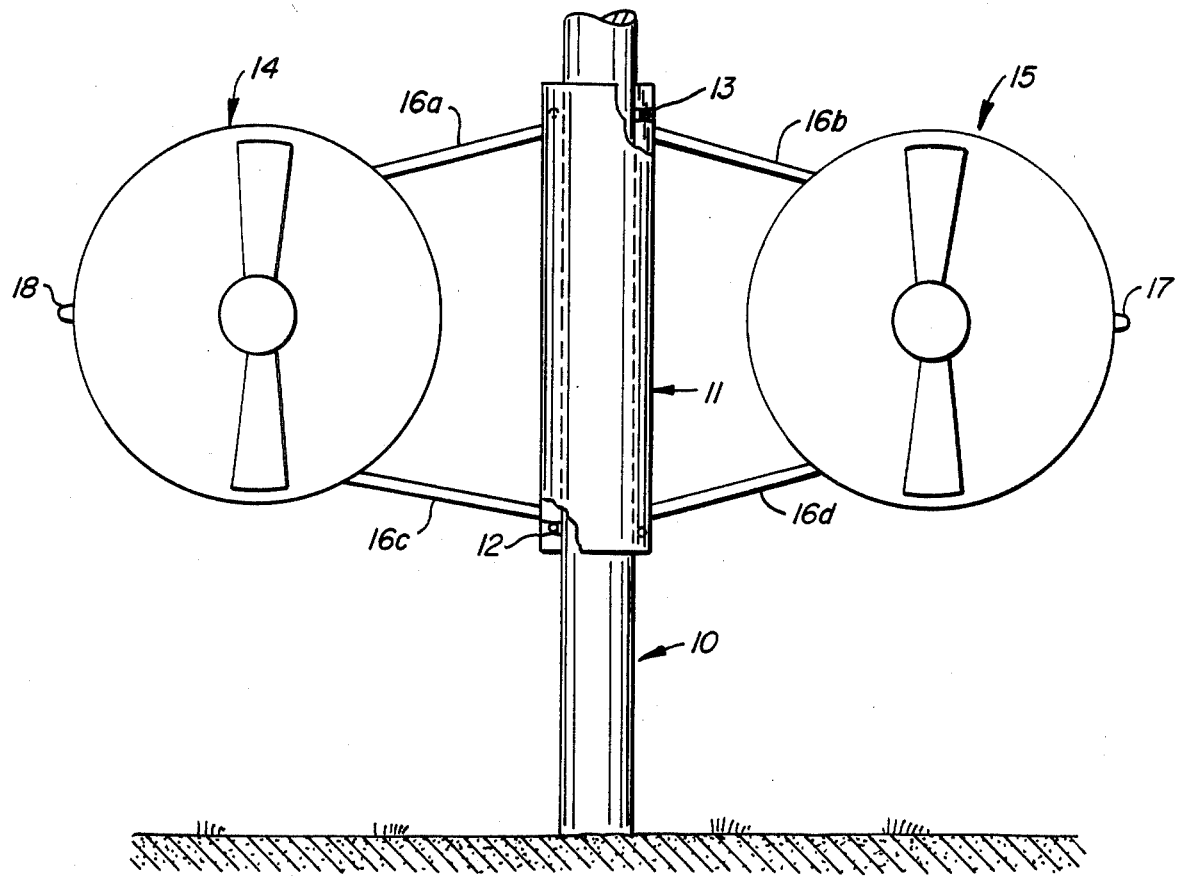
FIG._1.
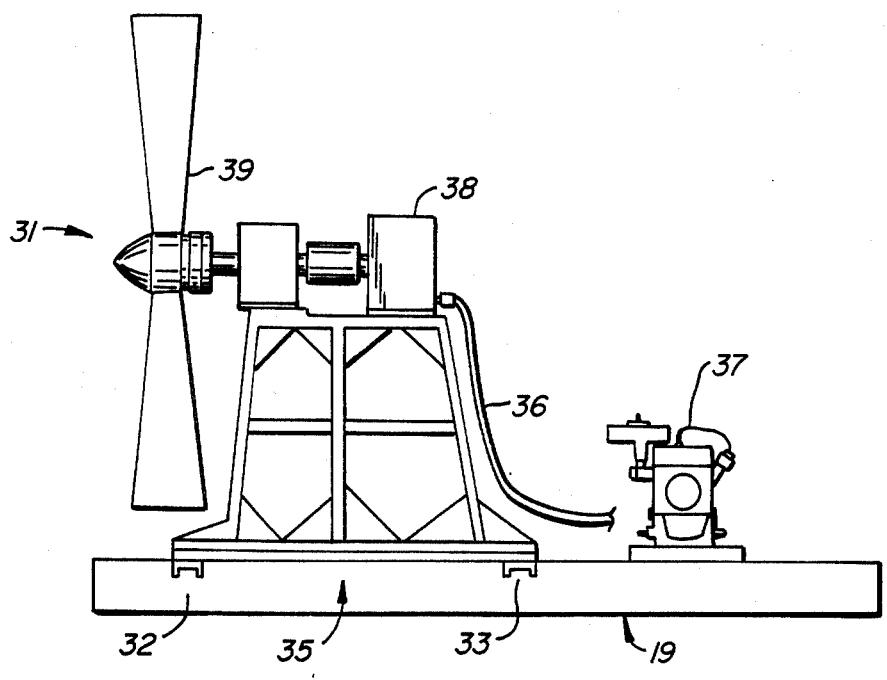
FIG._4.

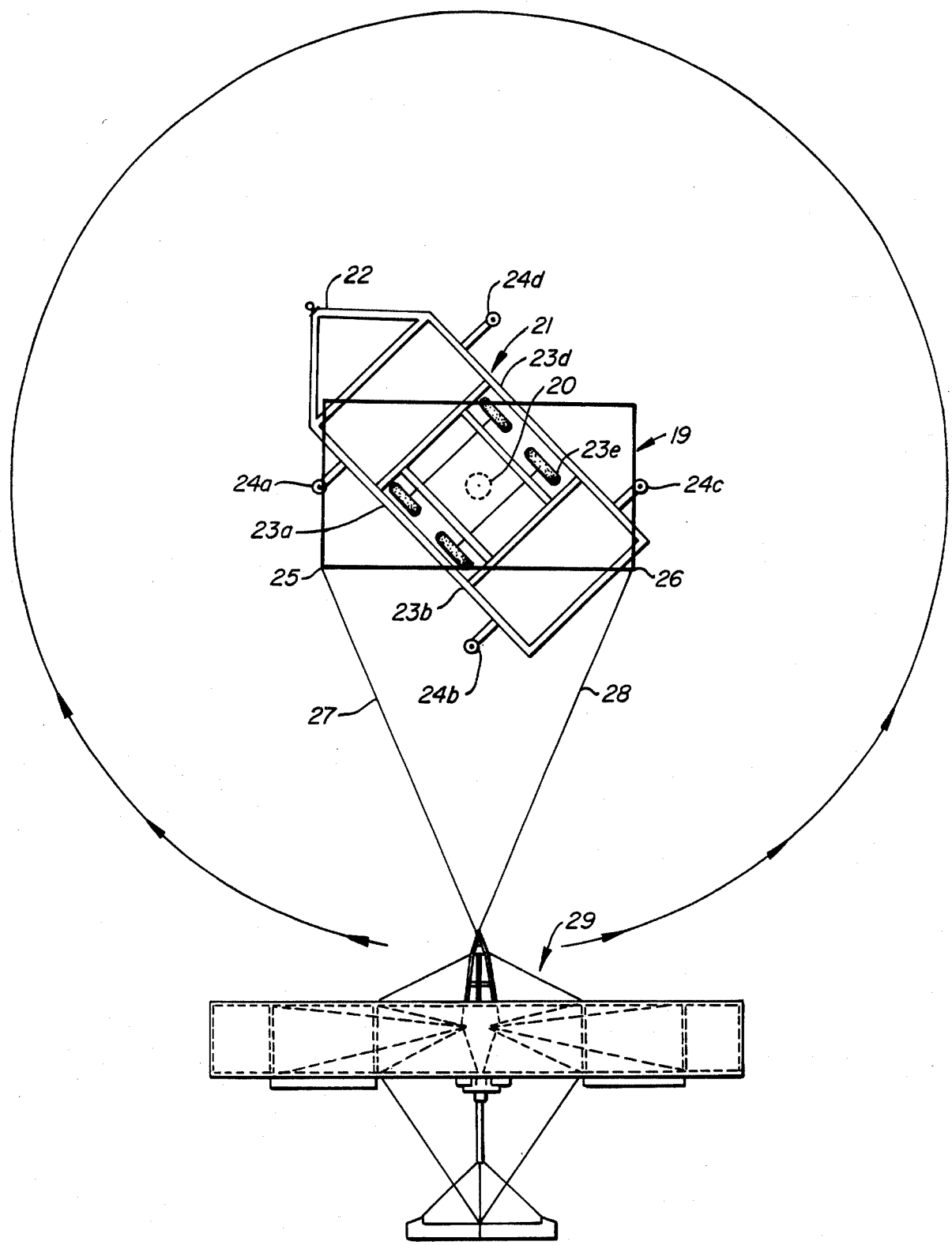
FIG._2.

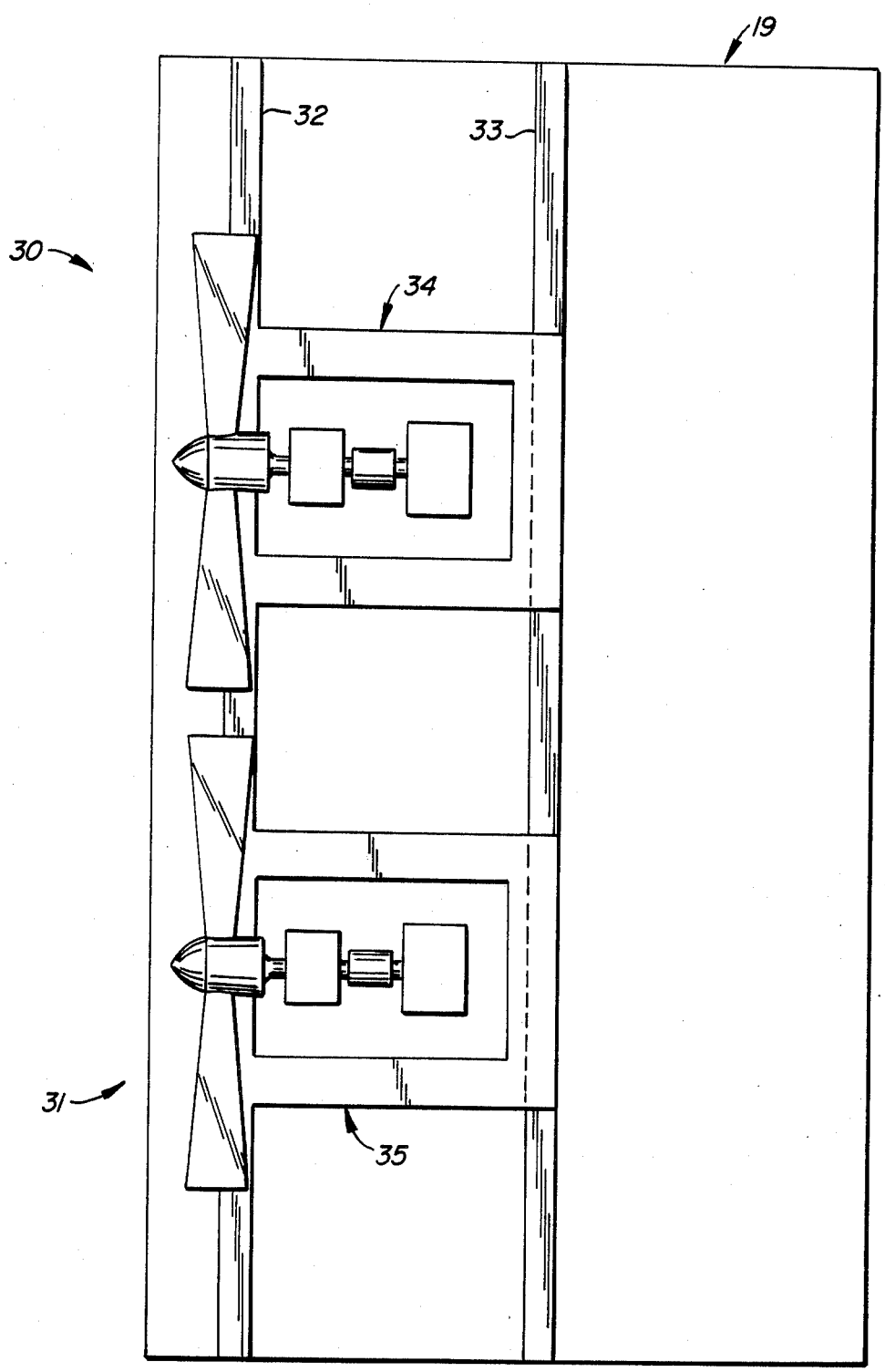
FIG._3.

TRAINING APPARATUS FOR ULTRALIGHT AIRCRAFT

DESCRIPTION

1. Technical Field

This invention relates to training methods and devices used in aviation, and more particularly to methods and devices for use in teaching the operation of lightweight or ultralight aircraft.

2. Background Art

Aviation had its beginnings in inexpensive unsophisticated designs which could be easily assembled and were not unduly difficult to maintain or fly. However since these beginnings, aviation technology has advanced rapidly and almost exclusively toward larger and more sophisticated aircraft. More recently aviation has returned to its earlier origins and there are now available numerous aircraft which are simple, lightweight and inexpensive. Along with this resurgence has come the need to provide proper instruction in what are essentially always one-person craft; they preclude the possibility of in flight training under the direct supervision of an instructor.

There has been available for decades a class of lightweight aircraft known as sailplanes and motorgliders. These craft are capable of seating up to three persons. They are virtually always less than 1,000 pounds, and some are as light as 350 pounds. The operation of these aircraft are governed by Federal Aviation Regulations, and training in a two-place aircraft is required before solo fight is permitted.

However, even with careful training, there is a period where the pilot has a greater risk of accident: when the transition is made from solo flight in a two-place trainer to solo flight in a single place aircraft. This results partly from inexperience with the different flying characteristics of the new craft. This risk would be alleviated if the pilot received a period of low altitude training in the new craft.

Recent regulations by the Federal Aviation Administration have defined a new class of aircraft called ultralight aircraft. 14 C.F.R. Section 103. Briefly, they may be described as weighing less than 155 pounds if unpowered, or if powered: (1) weighing less than 254 pounds empty; (2) having fuel capacity less than five gallons; (3) having maximum air speed of 55 knots at full power in level flight and (4) a power off stall speed not exceeding 24 knots. A restriction common to both powered and unpowered ultralight aircraft is that they are used or intended to be used for manned operation only by a single occupant. Aircraft fitting into these definitions they are not required to have an air-worthiness certificate and pilots are not required to meet any aeronautical knowledge, age or experience requirements. The only restriction in their use covers certain operating requirements as to time of day, visibility required, and restrictions as to airspace. Further information on the range of ultralight aircraft available may be found in Markowski, M. A., *Ultralight Aircraft*, Ultralight Publications, Hummelstown, Pa., 1981 or Markowski, M. A., *Ultralight Airplanes, Scientific American,* July 1982, pages 62–68.

In previous decades, there was some interest in devices which would provide simulation of in-flight experience, and perhaps also serve as carnival attractions. For a representative sample see: U.S. Pat. Nos. 1,947,962; 2,062,678, 2,323,322; 2,357,481 and 2,896,947. Of some interest is the device disclosed by Rockwell in U.S. Pat. No. 2,062,678.

A recent survey has indicated the range of training methods and apparatus available for the novice ultralight pilot. See 1983 Ultralight Aircraft Annual, Werner & Werner Corp., Encino, Calif., 1982, 1:pp. 46–50. These may broadly be classified in two categories: those where the plane is semi-rigidly attached to a ground vehicle, and those which involve taxiing or towing the aircraft over level ground for example an airplane runway, with little or no gain in altitude.

However these devices do not closely simulate actual flight conditions. The ground vehicle mounted devices allow a novice pilot to work the controls of the aircraft but do not actually simulate the various attitudes undertaken by the aircraft during normal flight. In addition these ground based vehicles also require a great amount of open space and they impart motions to the aircraft which do not coordinate with the sensory input and feedback a pilot receives through controlling his own flight attitude.

The methods which involve taxiing on runways require large amounts of space, and only permit very limited flight motion because the plane is restricted to an altitude of no more than a few feet. Thus it is one object of this invention to provide a method and apparatus for training pilots in the use of aircraft which does not require the dedication of large amounts of open space.

It is a further object of this invention to provide a method and apparatus for training aircraft pilots which enables the pilot to control the attitude of aircraft and simulate the greatest possible range of actual flying conditions.

It is a still further object of this invention to provide a method and apparatus which is adaptable to any of the numerous available light and ultralight aircraft.

It is another object of this invention to provide a method and apparatus for training aircraft pilots which allows the simulation of normal aircraft attitudes while maintaining low altitude and a high margin of safety.

It is a still further object of this invention to provide a training method and apparatus for aircraft pilots which is independent of external wind sources.

It is a still further object of this invention to provide a method and apparatus for training aircraft pilots which allows the instructor or operator to vary the ambient conditions so that numerous meteorological phenomenon may be simulated.

DISCLOSURE OF THE INVENTION

In accordance with this invention, methods and apparatus are provided for training aircraft pilots. According to one aspect of this invention, a training apparatus for use with an aircraft comprises movable support means, means on the support means for generating a generally horizontal air stream, and tethering means adapted to tether an aircraft to the support means while permitting the aircraft to move vertically in the air stream and horizontally with the tethering means connected to the support means to move the direction of the air stream with the aircraft as the aircraft moves horizontally.

Another aspect of this invention provides the method of training a pilot in the operation of an aircraft comprising generating a generally horizontal air-stream, flying an aircraft in the air stream with the aircraft headed generally into the air stream while moving the aircraft vertically and horizontally, and moving the air stream horizontally as the aircraft moves horizontally to keep the aircraft headed generally into the air stream.

BRIEF DESCRIPTION OF THE DRAWINGS

FIG. 1 is a front elevation, with portions removed, of a training apparatus for ultralight aircraft showing an embodiment of the present invention;

FIG. 2 is a top plan view, with portions removed, of a training apparatus for ultralight aircraft depicting another embodiment of the present invention as tethered to an aircraft;

FIG. 3 is a top plan view of an embodiment of a means for generating an airstream, which was a removed portion of the embodiment depicted in FIG. 2;

FIG. 4 is a side elevation of the means for generating an airstream shown in FIG. 3.

BEST MODE FOR CARRYING OUT THE INVENTION

This invention provides methods and apparatus for training a pilot in the use of aircraft and particularly lightweight aircraft which accommodate only one pilot.

Turning to FIG. 1 of the drawings, there is illustrated one embodiment of the training apparatus of the present invention. Generally, this embodiment comprises a movable support means, a means for generating a generally horizontal airstream and a tethering means for connecting the support means and airstream means to a lightweight or ultralight aircraft.

The support means of this embodiment comprises a pole 10 upon which is mounted a sleeve 11 which is capable of free rotation about the pole through the action of a plurality of bearing surfaces 12 and 13. This support means is constructed by any means known to the art sufficient to resist the forces generated during the training method of the instant invention.

Although in this embodiment, the support means is constrained to move in a circular orbit, it can be envisioned that other modes of motion may be practiced within the spirit and scope of the invention. For example, the support means could be mounted on a track which would allow generally horizontal or circumferential motion and in this manner the axis of rotation or axis of motion would be located outside of the body of the apparatus.

Upon the sleeve 11 are mounted two shrouded fans 14 and 15. The fans are mounted by a number of connecting members 16a, b, c and d, which maintain the axes of thrust of these fans in generally parallel orientation. The connecting members can be modified to allow adjustment of these axes, which will alter the characteristics of the air stream generated by these fans. These fans can be driven mechanically, hydraulically or electrically or by any other means known to the art. Although in this embodiment, the fans are shown with a shroud, this is merely one alternative means envisioned for controlling the disbursion of the air stream generated by the action of these fans.

Furthermore, while this embodiment depicts a pair of fans, the invention can obviously be practiced by merely a single fan or a plurality of fans provided they generate a sufficient air stream to provide lift to an attached aircraft.

Also shown in FIG. 1, is a pair of mounting points 17 and 18 which comprise one element of the tethering means of this invention. An aircraft is attached to these mounting points by tether lines. These tether lines can be either rigid or flexible and should be of such length that they provide adequate distance between the fans and the aircraft. The aircraft can be tethered to the training apparatus in a variety of ways, however, it is deemed advantageous to use some form of triangulation utilizing the width of the training apparatus. For example, the mounting points 17 and 18 may be removed from the fan shrouds and mounted on a bar attached directly to the sleeve 11. This arrangement increases the effective width of the apparatus without sacrificing other design considerations.

These tether lines may be mounted in numerous locations on the aircraft, however most light or ultra-light aircraft incorporate a towing hook aligned with the center of gravity of the craft. If such a towing hook is present, then a tether line is preferably connected to the towhook. In the absence of such tow-hook, alternative means of attachment can be found, and could include the fabrication of a special tethering harness connected through the center of gravity of the aircraft. This tethering harness would reduce the threat of damage to the structural integrity of the aircraft through the application of force in directions unanticipated by the designer of the craft. In addition, by careful attention to the center of gravity of the craft, the apparatus and the ultralight aircraft in operation will provide neutral stability and ease of handling.

With the foregoing description in mind, the operation of this training apparatus and method will now be described. In practice, a pilot is trained by tethering an aircraft to the apparatus, and generating a horizontal air stream. The movement of the air across the airfoil surfaces of the aircraft would impart lift to the aircraft, counteracting its weight. When the air stream attains sufficient velocity an aircraft will overcome its weight and gain altitude without requiring a forward component of thrust.

The maximum altitude for the aircraft will be defined by the envelope created by the moving air stream, for if the aircraft exceeds this altitude its airfoil does not generate sufficient lift and further increase of altitude will be prevented. The maximum altitude which may be attained by the aircraft will be determined in part by the distance at which the aircraft is tethered from the apparatus. This is due to the approximately conical shape of the resultant envelope of the air stream. The maximum altitude can be further controlled by appropriate baffling at the means for generating an air stream.

Considering this mode of flight, the pilot is trained in the use of the control stick to vary the angle of attack of the wing. This angle is defined by the airfoil chord and the relative wind striking the air foil. The pilot can also be trained in distance judgment to improve the ability to make a soft landing.

The action of rolling the aircraft to initiate a turn would ordinarily cause the airplane to fly outside of the envelope of the air stream resulting in loss of lift. However, due to the movable mounting of the support means, and the tethering means attaching the aircraft to the apparatus, the aircraft's roll will impart angular momentum to the apparatus causing it to rotate about its central axis. This rotation allows a banked attitude to be maintained in the aircraft while still keeping the aircraft centered in the envelope of the air stream. Care must be taken not to exceed a certain angle of bank, for a low-winged aircraft may damage a wingtip by striking the ground.

In addition, as mentioned previously, by modulating independently controllable wind sources either through change in direction or change in velocity relative one to the other, various meteorlogical conditions can be simulated such as cross-winds, turbulence, etc. to provide more skillful pilots with relatively safe training in conditions which more closely simulate those which would be encountered in actual flight.

Referring to the drawings, FIGS. 2-4 show a portable embodiment of the invention. In this embodiment, the support means includes a main frame 19 mounted by a bearing surface 20 to a portable secondary frame 21.

The secondary frame 21 can be constructed as a trailer by incorporating a towing hitch 22 and a plurality of wheels, for example 23a, b, c and d. In addition, the secondary frame preferably includes a plurality of leveling or bracing members 24a, b, c, and d, so that the secondary frame can be rendered immobile and can be positioned in an advantageous manner with respect to uneven ground terrain.

The main frame 19 of the support means also includes mounting points 25 and 26 whereby the tether lines 27 and 28 may be attached and tether the aircraft 29 to the support means.

In FIG. 3, the means for generating an air stream is disclosed as a pair of propeller fans 30 and 31 mounted on the main frame 19 of the support means. These fans may be driven as the fans previously described by mechanical, hydraulic, electrical or any other means known to the art. Furthermore, these fans, as in the previous case can be driven by a single motor and controlled simultaneously. Alternatively they can be controlled independently either through variable reduction gears, hydraulic proportioning or through the use of separate power devices which are independently regulated.

The means for generating an airstream can also include a means for controlling the flow of air, located remotely from the generating means. In practice, this can utilize either a mechanical or radio controlled throttling device with a control unit accessable to either the instructor or to the pilot of the aircraft.

In addition, these fans can include a shrouding device or any other arrangement of baffles which help direct and concentrate the airstream so that the maximum current is directed to the area defined by the wingtips of the aircraft.

The main frame 19 of the support means also includes rails 32 and 33 upon which the fan devices 30 and 31 are mounted by pedestals 34 and 35. These rails can be constructed so as to allow certain adjustments to be made in the position of pedestals 34 and 35. By varying the direction of the horizontal axes of the fans, any desired variation in the shape and nature of the air stream is obtainable.

In FIG. 4, the fan device 31 is shown together with its pedestal 35 attached by a hydraulic coupling 36 to a power source 37. This anticipates the use of a hydraulic power transmission 38 to drive the propeller 39. Thus, in practice the power source 37 can be used to drive both fan devices 30 and 31 by means obvious to those having ordinary skill in the art.

Although the foregoing invention has been described in some detail by way of illustration and example for purposes of clarity of understanding, it will be obvious to one skilled in the art that certain changes and modifications may be practiced within the scope of the appended claims.

We claim:

1. Training apparatus for use with an aircraft comprising:
   movable support means;
   means on the support means for generating a generally horizontal airstream; and
   tethering means adapted to tether an aircraft to the support means while permitting the aircraft to move vertically in the airstream and horizontally with the tethering means connected to the support means to move the direction of the airstream with the aircraft as the aircraft moves horizontally.

2. Training apparatus as recited in claim 1 wherein the support means is pivotally mounted for rotation about a generally vertical axis.

3. Training apparatus as recited in claim 1 wherein the tethering means further comprises connecting means connecting the aircraft to the support means on opposite sides of a plane passing generally through the vertical axis of the apparatus.

4. Training apparatus as recited in claim 1 wherein said support means further comprises a portable secondary frame capable of being transported and releasably rendered immobile.

5. Training apparatus as recited in claim 1 further comprising an aircraft connected to said tethering means.

6. The method of training a pilot in the operation of an aircraft comprising:
   generating a generally horizontal air stream;
   flying an aircraft in the air stream with the aircraft headed generally into the airstream while moving the aircraft vertically and horizontally; and
   moving the airstream horizontally as the aircraft moves horizontally to keep the aircraft headed generally into the air stream.

* * * * *